United States Patent
Hoter-Ishay

(10) Patent No.: US 10,738,755 B1
(45) Date of Patent: Aug. 11, 2020

(54) HYDROSTATIC PRESSURE TURBINES AND TURBINE RUNNERS THEREFOR

(71) Applicant: On Hoter-Ishay, Toronto (CA)

(72) Inventor: On Hoter-Ishay, Toronto (CA)

(73) Assignee: On Hoter-Ishay (CA)

( * ) Notice: Subject to any disclaimer, the term of this patent is extended or adjusted under 35 U.S.C. 154(b) by 0 days.

(21) Appl. No.: 16/662,632

(22) Filed: Oct. 24, 2019

(51) Int. Cl.
*F03B 7/00* (2006.01)
*F03B 17/06* (2006.01)

(52) U.S. Cl.
CPC .............. *F03B 7/00* (2013.01); *F03B 17/061* (2013.01)

(58) Field of Classification Search
CPC ........... F03B 17/02; F03B 7/00; F03B 17/061
See application file for complete search history.

(56) References Cited

U.S. PATENT DOCUMENTS

2008/0159873 A1\* 7/2008 Tran ...................... F03B 17/063
416/248
2010/0013228 A1\* 1/2010 Duggleby ............. F03B 13/264
290/53

\* cited by examiner

*Primary Examiner* — Kayla Mccaffrey
(74) *Attorney, Agent, or Firm* — Tarolli, Sundheim, Covell & Tummino LLP

(57) ABSTRACT

Hydrostatic pressure turbine runners according to the present disclosure are designed for maximally exploiting the hydrostatic pressure of a flowing fluid, rather than maximizing extraction of kinetic energy from the flow. The design converts less kinetic energy of the flow into hydropower as compared with current run-of-river turbine runner technologies. However, hydrostatic pressure turbine runners according to the present disclosure convert substantially more potential energy into hydropower. As a result, the total amount of energy converted into hydropower is significantly higher than the hydropower available from conventional run-of-river turbine runner designs, and, without promising any particular utility, may be capable of surpassing the upper limit of converted energy as defined by Betz' law. In a run-of-river context, the total amount of converted energy—mainly converted potential energy—may surpass the amount of kinetic energy of the flow engaged by the turbine runner.

5 Claims, 12 Drawing Sheets

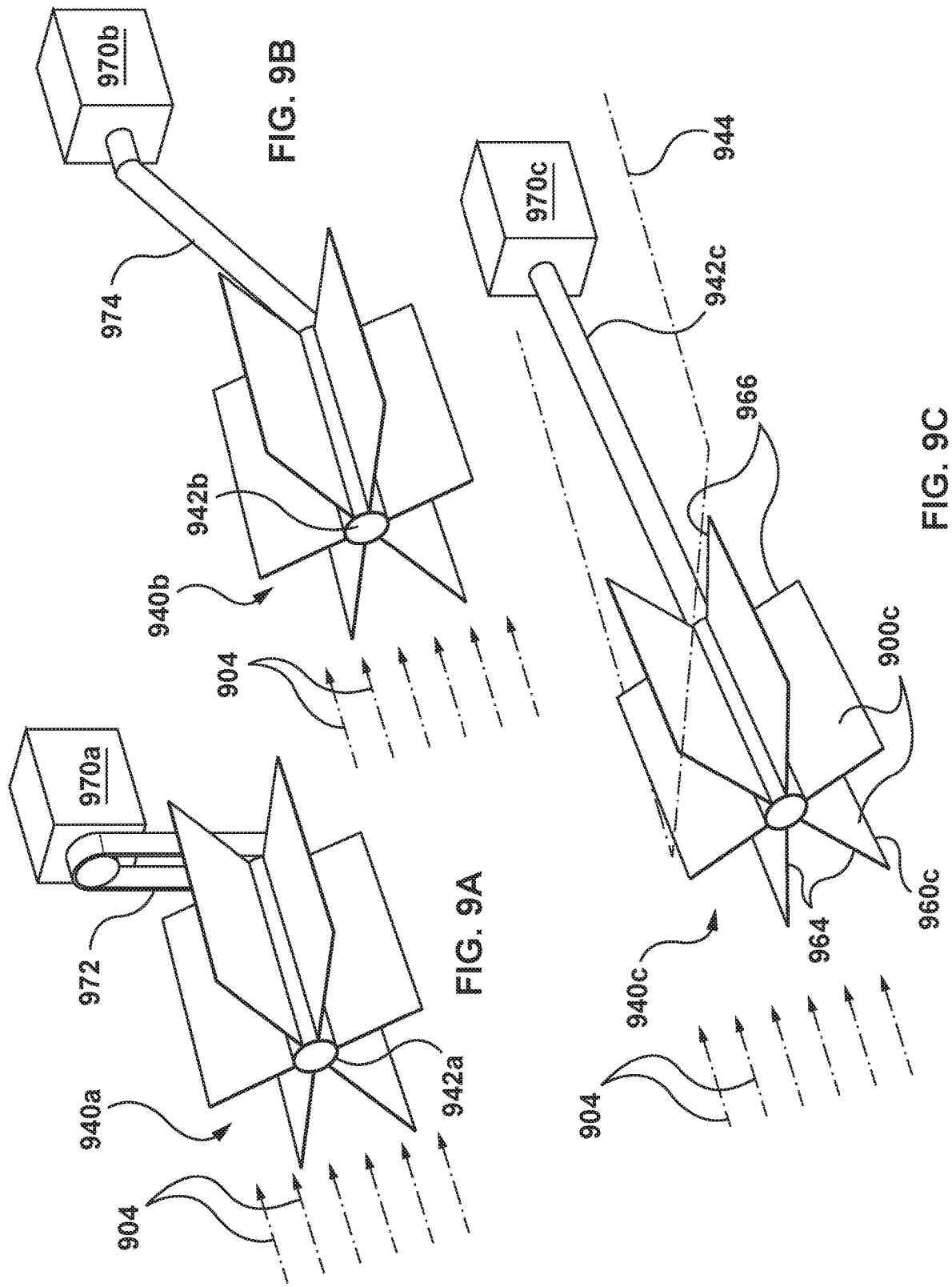

HYDROSTATIC PRESSURE TURBINES AND TURBINE RUNNERS THEREFOR

TECHNICAL FIELD

The present disclosure relates to turbines for generating hydropower from flat-flowing rivers and other hydropower generation applications.

BACKGROUND

Run-of-river hydropower generation has been known to humankind since the age of antiquity, and is still in common use in the modern era. The term "run-of-river hydropower" refers to hydropower installations used for extracting hydropower with minimal interference with the water flow, typically used on flat-flowing rivers. The simplest method of run-of-river hydropower generation is based on immersing a turbine runner into the flow and converting the kinetic energy of the flow into hydropower. The turbine runners range from the simple waterwheel of ancient times to those found in the sophisticated hydroelectric turbines of the present day. Run-of-river hydropower is known to be environmentally benign and cost-effective. As more than 75% of the surface of the earth is flat, the potential of hydropower generation out of flat-flowing rivers is significant.

Flat-flowing rivers are characterized by lesser slope along the riverbed. Hence, they provide very limited "head" for energy-extraction ("head" is a measure of hydrostatic pressure in hydraulic systems, measured as the elevation of the upper surface of the liquid fed into the installation above the discharge surface level). The currently recognized upper operational efficiency limit of modern turbine technologies is known to be less than 60% of the kinetic energy of the flow running through the turbine. That upper operational efficiency limit was established in 1919 by the German physicist Alfred Betz. It is founded on both theoretical physics and practical considerations. Betz' Law—named after its author—is a theoretical physical law, supported by experimental results, that sets the upper limit of extracting kinetic energy from a flow at 0.593 (59.3%) of the total kinetic energy going through the device extracting the energy. Betz' law is currently considered a benchmark against which new flow-hydropower turbine designs are evaluated. Increasing the efficiency of the turbine in extracting the energy of the flow is one of the main objectives of turbine design.

SUMMARY

The present disclosure is directed to a hydrostatic pressure turbine runner designed to extensively extract hydropower by exploiting primarily the hydrostatic pressure of the flow, as well as a lesser portion of its kinetic energy. Without being limited by theory, and without promising any particular utility, it is believed that hydrostatic pressure turbine runners according to aspects of the present invention can, in at least some instances, extract hydropower in an amount that exceeds the amount of hydropower established by Betz' law as the upper operational efficiency limit.

That higher energy extraction rate is achieved by exploiting the potential energy of the flow, rather than focusing on extracting its kinetic energy. Whereas Betz' law determines the upper limit of extraction of the kinetic energy of the flow, any flow also carries potential energy that can be extracted regardless of the amount of kinetic energy carried by that flow.

The potential energy of fluid is embodied by the hydrostatic pressure of the fluid (for example, Bernoulli's Law). The hydrostatic pressure of a flow is the fluid pressure measured in a direction that is perpendicular to the flow direction, whereas the hydrokinetic pressure is the fluid pressure of the flow measured in the direction of the motion of the flow.

Hydrostatic pressure turbine runners according to the present disclosure are designed for maximally exploiting the hydrostatic pressure of the fluid, rather than maximizing extraction of kinetic energy from the flow. The novel design converts less kinetic energy of the flow into hydropower as compared with current run-of-river turbine runner technologies. However, hydrostatic pressure turbine runners according to the present disclosure convert substantially more potential energy into hydropower. As a result, the total amount of energy converted into hydropower is significantly higher than the hydropower available from conventional run-of-river turbine runner designs, and, without promising any particular utility, may be capable of surpassing the upper limit of converted energy as defined by Betz' law. In a run-of-river context, the total amount of converted energy—mainly converted potential energy—may surpass the amount of kinetic energy of the flow engaged by the turbine runner. Additionally, as compared to current run-of-river turbine runners, hydrostatic pressure turbine runners according to the present disclosure do not substantially slow the speed of the flow to extract the energy. Current turbine runners need to slow down the water-flow for extracting its kinetic energy.

In one aspect, a method for extracting potential energy from a flowing liquid is described. The method comprises immersing at least one hydrostatic pressure blade in the liquid so that each hydrostatic pressure blade has an upstream face relative to a flow of the liquid and a downstream face relative to the flow of the liquid, whereby a pressure gradient is created between the upstream face and the downstream face of each hydrostatic pressure blade in which an upstream pressure on the upstream face exceeds a downstream pressure on the downstream face. The pressure gradient applies a hydrostatic force to the upstream face of each hydrostatic pressure blade, substantially perpendicular to the flow of the liquid. The hydrostatic force and the flow of the liquid each apply a respective force to each hydrostatic pressure blade to drive movement of each hydrostatic pressure blade across the flow of the liquid, substantially perpendicular to the flow of the liquid, to rotate a driven shaft of a power extraction mechanism to which each hydrostatic pressure blade is mechanically coupled. A contribution of the hydrostatic force to a total force driving movement of each hydrostatic pressure blade across the flow of the liquid exceeds ten percent (10%) of the total force driving movement of each hydrostatic pressure blade across the flow of the liquid.

Preferably, the contribution of the hydrostatic force to the total force driving movement of each hydrostatic pressure blade across the flow exceeds 15% of the total force driving movement of each hydrostatic pressure blade across the flow, more preferably the contribution of the hydrostatic force to the total force exceeds 20%, still more preferably 30%, even more preferably 40%, still even more preferably 50%, yet still even more preferably 60%, yet still even more further preferably 70%. It is particularly preferred that the contribution of the hydrostatic force to the total force exceeds 80% and most preferably exceeds 90%.

In some embodiments, the total energy extracted from the liquid by the movement of each hydrostatic pressure blade across the flow of the liquid driven by the hydrostatic force and the flow of the liquid exceeds an amount equal to 60% of kinetic energy available solely from the flow of the liquid.

In another aspect, a hydrostatic pressure turbine runner comprises a rotatable shaft and at least one hydrostatic pressure blade carried by the rotatable shaft, with each hydrostatic pressure blade having an upstream face relative to a flow direction for the hydrostatic pressure turbine runner and a downstream face relative to the flow direction for the hydrostatic pressure turbine runner. Each hydrostatic pressure blade has an angle of attack θ measured between the upstream face and the flow direction for the hydrostatic pressure turbine runner wherein the angle of attack θ is non-zero and is less than or equal to 35° (0<θ≤35°).

Preferably, the angle of attack θ is less than or equal to thirty degrees (0<θ≤30°), still more preferably less than or equal to twenty-five degrees (0<θ≤25°) and yet still more preferably less than or equal to twenty degrees (0<θ≤20°).

A hydrostatic pressure turbine may incorporate the hydrostatic pressure turbine runner as described above.

In still another aspect, a hydrostatic pressure turbine runner comprises a rotatable shaft and at least one hydrostatic pressure blade carried by the rotatable shaft, with each hydrostatic pressure blade having an upstream face relative to a flow direction for the hydrostatic pressure turbine runner and a downstream face relative to the flow direction for the hydrostatic pressure turbine runner. Each hydrostatic pressure blade has a span between an innermost edge of the hydrostatic pressure blade relative to the shaft, and an outermost edge of the hydrostatic pressure blade relative to the shaft, measured perpendicular to the flow direction for the hydrostatic pressure turbine runner. Each hydrostatic pressure blade has an angle of attack θ measured between the upstream face and the flow direction for the hydrostatic pressure turbine runner. Each hydrostatic pressure blade has a cord length defined as a distance between a foremost leading edge of the hydrostatic pressure blade and a rearmost trailing edge of the hydrostatic pressure blade, measured parallel to the flow direction for the hydrostatic pressure turbine runner. Each hydrostatic pressure blade has a longitudinal engagement extent (LEE) defined as the product of the cord length and the sine of the angle of attack θ, and for each hydrostatic pressure blade, the value of the LEE divided by the span is greater than 0.75.

Preferably, the value of the LEE divided by the span is greater than 0.85 and more preferably greater than 1.

The hydrostatic pressure turbine runner as described above may be incorporated into a hydrostatic pressure turbine.

In still a further aspect, a method for extracting potential energy from a flowing liquid is described. The method comprises immersing at least one hydrostatic pressure blade in the liquid so that each hydrostatic pressure blade has an upstream face relative to a flow of the liquid and a downstream face relative to the flow of the liquid, whereby a pressure gradient is created between the upstream face and the downstream face of each hydrostatic pressure blade wherein an upstream pressure on the upstream face exceeds a downstream pressure on the downstream face. The pressure gradient applies a hydrostatic force to the upstream face of each hydrostatic pressure blade, substantially perpendicular to the flow of the liquid. The hydrostatic force and the flow of the liquid each apply a respective force to each hydrostatic pressure blade to drive movement of each hydrostatic pressure blade across the flow of the liquid, substantially perpendicular to the flow of the liquid, to rotate a driven shaft of a power extraction mechanism to which each hydrostatic pressure blade is mechanically coupled. The total energy extracted from the liquid by the movement of each hydrostatic pressure blade across the flow of the liquid driven by the hydrostatic force and the flow of the liquid exceeds an amount equal to 60% of kinetic energy available solely from the flow of the liquid.

Preferably, the total energy extracted from the liquid by the movement of each hydrostatic pressure blade across the flow of the liquid driven by the hydrostatic force and the flow of the liquid exceeds an amount equal to 66% of the kinetic energy available solely from the flow of the liquid.

In still yet a further aspect, a hydrostatic pressure turbine runner comprises a rotatable shaft and at least one hydrostatic pressure blade carried by the rotatable shaft. Each hydrostatic pressure blade has an upstream face relative to a flow direction for the hydrostatic pressure turbine runner and a downstream face relative to the flow direction for the hydrostatic pressure turbine runner. Each hydrostatic pressure blade has a non-zero angle of attack θ, measured between the upstream face and the flow direction for the hydrostatic pressure turbine runner, that is less than or equal to 35° (0<θ≤35°). Each hydrostatic pressure blade has a span between an innermost edge of the hydrostatic pressure blade relative to the shaft, and an outermost edge of the hydrostatic pressure blade relative to the shaft, measured perpendicular to the flow direction for the hydrostatic pressure turbine runner. Each hydrostatic pressure blade has a cord length defined as a distance between a foremost leading edge of the hydrostatic pressure blade and a rearmost trailing edge of the hydrostatic pressure blade, measured parallel to the flow direction for the hydrostatic pressure turbine runner. Each hydrostatic pressure blade has a longitudinal engagement extent (LEE) defined as the product of the cord length and the sine of the angle of attack θ. For each hydrostatic pressure blade, the value of the LEE divided by the span is greater than 0.75. When a liquid flows past the hydrostatic pressure turbine runner in the flow direction of the hydrostatic pressure turbine runner, a pressure gradient is created between the upstream face and the downstream face of each hydrostatic pressure blade wherein an upstream pressure on the upstream face exceeds a downstream pressure on the downstream face. The pressure gradient applies a hydrostatic force to the upstream face of each hydrostatic pressure blade, substantially perpendicular to the flow of the liquid. The hydrostatic force and the flow of the liquid each apply a respective force to each hydrostatic pressure blade to drive movement of each hydrostatic pressure blade across the flow of the liquid, substantially perpendicular to the flow of the liquid, to rotate the rotatable shaft. The total energy extracted from the liquid by the movement of each hydrostatic pressure blade across the flow of the liquid driven by the hydrostatic force and the flow of the liquid exceeds an amount equal to 66% of kinetic energy available solely from the flow of the liquid.

BRIEF DESCRIPTION OF THE DRAWINGS

These and other features will become more apparent from the following description in which reference is made to the appended drawings wherein:

FIGS. 9A through 9E show examples of transfer arrangements for transmitting power from a hydrostatic pressure turbine runner to a power extraction mechanism according to aspects of the present disclosure.

DETAILED DESCRIPTION

Figure 1A:
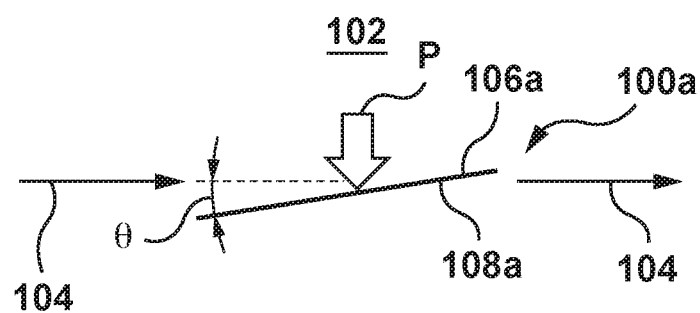
FIGS. 1A and 1B are schematic views, respectively, showing the profile of a hydrostatic pressure blade according to an aspect of the present disclosure.
Figure 1B:
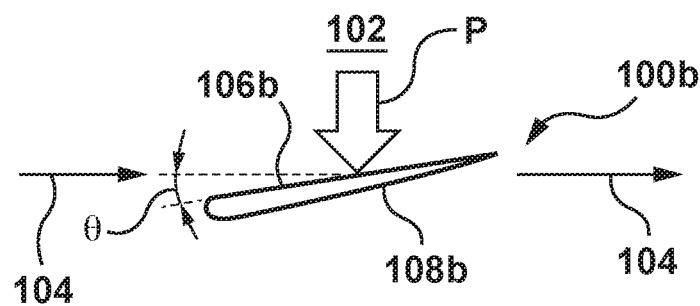

Reference is now made to FIGS. 1A and 1B for the purpose of providing a brief theoretical review of certain principles relevant to aspects of the present disclosure. FIGS. 1A and 1B are schematic views showing the profile of a hydrostatic pressure blade, indicated generally by reference 100a and 100b, respectively, immersed in a flowing liquid 102 (e.g. a flat-flowing river) which has a flow direction indicated by left-to-right arrows 104. The term "hydrostatic pressure blade", as used herein, refers to a blade for a turbine runner that is specifically adapted for extracting power out of the hydrostatic pressure of a flowing liquid such that a substantial proportion of the total force driving movement of each hydrostatic pressure blade 100a, 100b across the flow 104 is contributed by the hydrostatic force. As immersed, the hydrostatic pressure blade 100a, 100b has an upstream face 106a, 106b relative to the flow 104 of the liquid 102 and a downstream face 108a, 108b relative to the flow 104 of the liquid 102. FIG. 1A shows a hydrostatic pressure blade 100a whose upstream face 106a and downstream face 108a are both substantially planar, while FIG. 1B shows a hydrostatic pressure blade 100b whose upstream face 106b is substantially planar but whose downstream face 108b has an asymmetric convex shape.

As will be seen in FIGS. 1A and 1B, the hydrostatic pressure blade 100a, 100b has a non-zero angle of attack θ measured between the upstream face 106a, 106b and the flow direction 104. According to well-recognized laws of physics, under these conditions the flow 104 generates a pressure gradient between the upstream face 106a, 106b and the downstream face 108a, 108b of the hydrostatic pressure blade 100a, 100b. More particularly, the upstream pressure on the upstream face 106a, 106b exceeds the downstream pressure on the downstream face 108a, 108b whereby a pressure gradient is created between the upstream face 106a, 106b and the downstream face 108a, 108b of the hydrostatic pressure blade 100a, 100b. That pressure gradient applies a hydrostatic force, denoted by the arrow P, equal to the product of the pressure gradient and the surface area of the hydrostatic pressure blade 100a, 100b. Hence, the larger the surface area of the hydrostatic pressure blade 300, the greater the hydrostatic force P applied. The hydrostatic force P is applied to the upstream face 106a, 106b of each hydrostatic pressure blade 100a, 100b, substantially perpendicular to the flow 104 of the river 102. If the hydrostatic pressure blade 100a, 100b is fixed to a rotatable support whose axis of rotation is substantially parallel to the flow 104 and that inhibits the hydrostatic pressure blade 100a, 100b from moving in the flow direction 104, the hydrostatic pressure blade 100a, 100b will be pushed by that hydrostatic force P to rotate across the flow; i.e. perpendicular to the flow direction 104. The theoretical hydropower generated by this arrangement, e.g. by rotating a driven shaft of a power extraction mechanism to which the hydrostatic pressure blade 100a, 100b is mechanically coupled, is the product of the hydrostatic force P applied on the the hydrostatic pressure blade 100a, 100b and the velocity of the the hydrostatic pressure blade 100a, 100b across the flow 104.

Both potential energy and kinetic energy play a role in any hydropower generation arrangement. The force applied to the hydrostatic pressure blade 100a, 100b by the flow 104 of the river 102 is generated by two different and distinct physical phenomena: the hydrostatic pressure (i.e. hydrostatic force P) of the fluid, acting perpendicularly to the direction of the flow 104; and the hydrokinetic pressure of the fluid, acting in the direction of the flow 104. That combined force, acting on the hydrostatic pressure blade 100a 100b substantially perpendicularly to the upstream face 106a, 106b of the blade 106a, 106b, drives movement of the hydrostatic pressure blade 100a, 100b across the flow 104 of the river 102. This movement is substantially perpendicular to the flow 104 of the river 102 since the hydrostatic pressure blade 100a 100b is inhibited by the rotatable support from moving in any other direction.

Conventional flow-driven turbine runners are generally designed to extract the maximum available kinetic energy. However, importantly and in fact critically, hydrostatic pressure turbine runners according to the present disclosure are distinguished from conventional flow-driven turbine runners in that a substantial proportion of the total force driving movement of each hydrostatic pressure blade across the flow is contributed by the hydrostatic force. This allows the potential energy of the water to be extensively exploited. Thus, a "hydrostatic pressure turbine runner" is a turbine runner that incorporates hydrostatic pressure blades positioned at an angle of attack adapted for extracting power out of the hydrostatic pressure of a flowing liquid so that a substantial proportion of the total force driving movement of each hydrostatic pressure blade across the flow is contributed by the hydrostatic force.

In hydrostatic pressure turbine runners according to the present disclosure, the contribution of the hydrostatic force to the total force driving movement of each hydrostatic pressure blade across the flow exceeds 10% of the total force driving movement of each hydrostatic pressure blade across the flow. Preferably, the contribution of the hydrostatic force to the total force driving movement of each hydrostatic pressure blade across the flow exceeds 15% of the total force driving movement of each hydrostatic pressure blade across the flow, more preferably the contribution of the hydrostatic force to the total force exceeds 20%, still more preferably 30%, even more preferably 40%, still even more preferably 50%, yet still even more preferably 60%, yet still even more further preferably 70%. It is particularly preferred that the contribution of the hydrostatic force to the total force exceeds 80% and most preferably exceeds 90%. Where the hydrostatic pressure blade is mechanically coupled to a driven shaft of a power extraction mechanism, in some embodiments the total energy extracted (e.g. from the river 102) by the movement of each hydrostatic pressure blade across the flow driven by the combination of the hydrostatic force and the kinetic energy from the flow exceeds an amount equal to 60%, and preferably exceeds an amount equal to 66%, of the kinetic energy available solely from the flow. Thus, in some embodiments the amount of hydropower generated by a hydrostatic pressure turbine runner according to aspects of the present disclosure may exceed the upper operational efficiency limit for a conventional flow-driven turbine runner as established by Betz' law.

As noted above, FIG. 1A shows a hydrostatic pressure blade 100a whose upstream face 106a and downstream face 108a are both substantially planar, while FIG. 1B shows a shows a hydrostatic pressure blade 100b whose upstream face 106b is substantially planar but whose downstream face 108b has an asymmetric convex shape. The latter shape, somewhat similar to the profile of an aircraft wing, results in an increased pressure gradient from the flow 104. Hence, under the same conditions the hydrostatic pressure blade 100b in FIG. 1B is subject to a larger hydrostatic force P than the hydrostatic pressure blade 100a in FIG. 1A, as indicated by the larger arrow P shown in FIG. 1B. Moving across the flow 104 at an equal velocity, the hydrostatic pressure blade 100b in FIG. 1B generates more energy than the hydrostatic pressure blade 100a in FIG. 1A.

Figure 2A:
FIG. 2A shows a hydrostatic pressure blade having its upstream face concavely curved and its downstream face convexly curved, according to an aspect of the present disclosure.
Figure 2B:
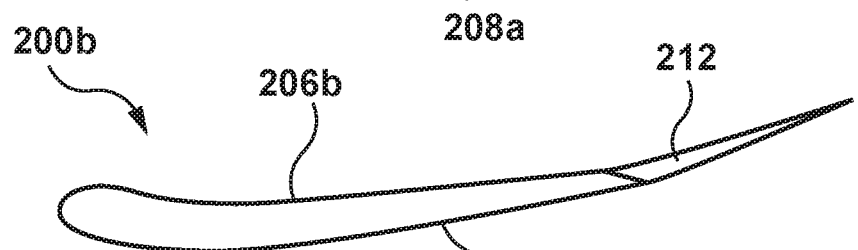
FIG. 2B shows a hydrostatic pressure blade having its upstream face concavely curved and its downstream face convexly curved, and having a flap at the trailing edge thereof, according to an aspect of the present disclosure.
Figure 2C:
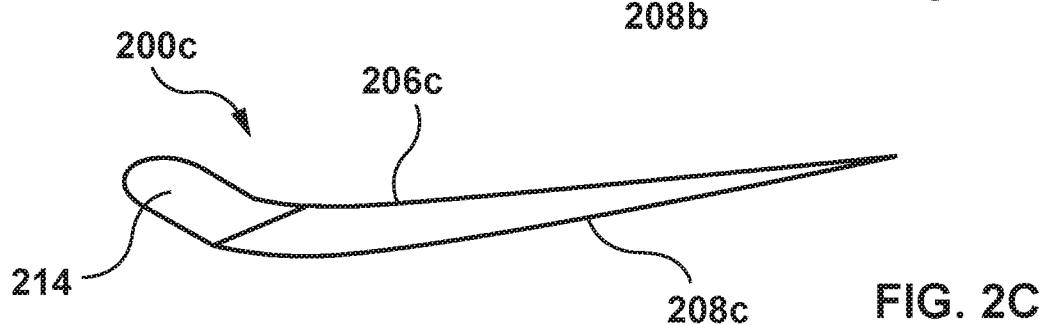
FIG. 2C shows a hydrostatic pressure blade having its upstream face concavely curved and its downstream face convexly curved, and having a flap at the leading edge thereof, according to an aspect of the present disclosure.

The performance of a hydrostatic pressure blade according to the present disclosure can be enhanced further by various modifications to the profile thereof and by the addition of further structural elements, some illustrative examples of which are shown in FIGS. 2A through 2C.

FIG. 2A shows a hydrostatic pressure blade 200a having both its upstream face 206a and its downstream face 208a curved. The upstream face 206a is concavely curved while the downstream face 208a is convexly curved. FIGS. 2B and 2C each show a hydrostatic pressure blade 200b, 200c having its upstream face 206b, 206c concavely curved and its downstream face 208b, 208c convexly curved, with the blade profiles further enhanced by flaps 212, 214. The flaps 212, 214 are movable mechanical devices that allow selective modification of the profile of the hydrostatic pressure blade 200b, 200c by, for example, increasing the cord B (see FIG. 3A), modifying the curvature, etc. The flaps 212, 214 can be configured to be extended or retracted, and to have their relative angles altered, by way of suitable mechanical contrivances, depending on the variable conditions of the flow. The hydrostatic pressure blade 200b in FIG. 2B has a flap 212 at the trailing edge thereof, and the hydrostatic pressure blade 200c in FIG. 2C has a flap 214 at the leading edge thereof. It is also contemplated that hydrostatic pressure blades according to the present disclosure may include flaps at both the leading edge and the trailing edge.

Defining the optimal curvature required for a hydrostatic pressure blade depends on many technical factors, as well as on the characteristics of the flow, and such is within the capability of one skilled in the art, now informed by the present disclosure.

Figure 8A:
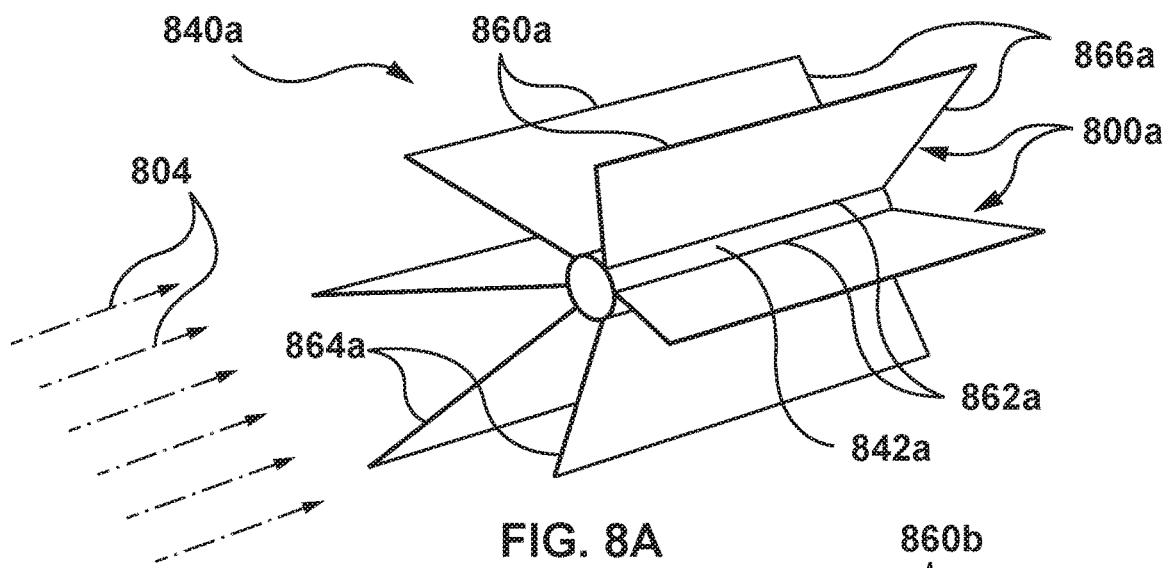
FIGS. 8A to 8F show various modifications to hydrostatic pressure blades according to aspects of the present disclosure.
Figure 8B:
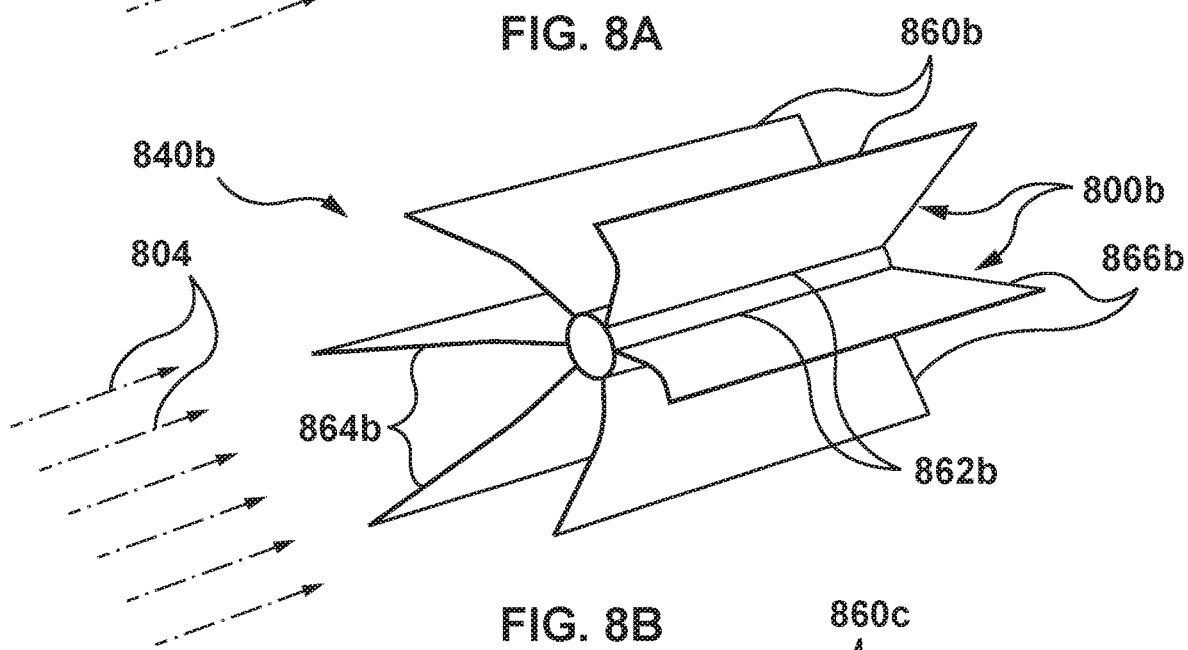
Figure 8C:
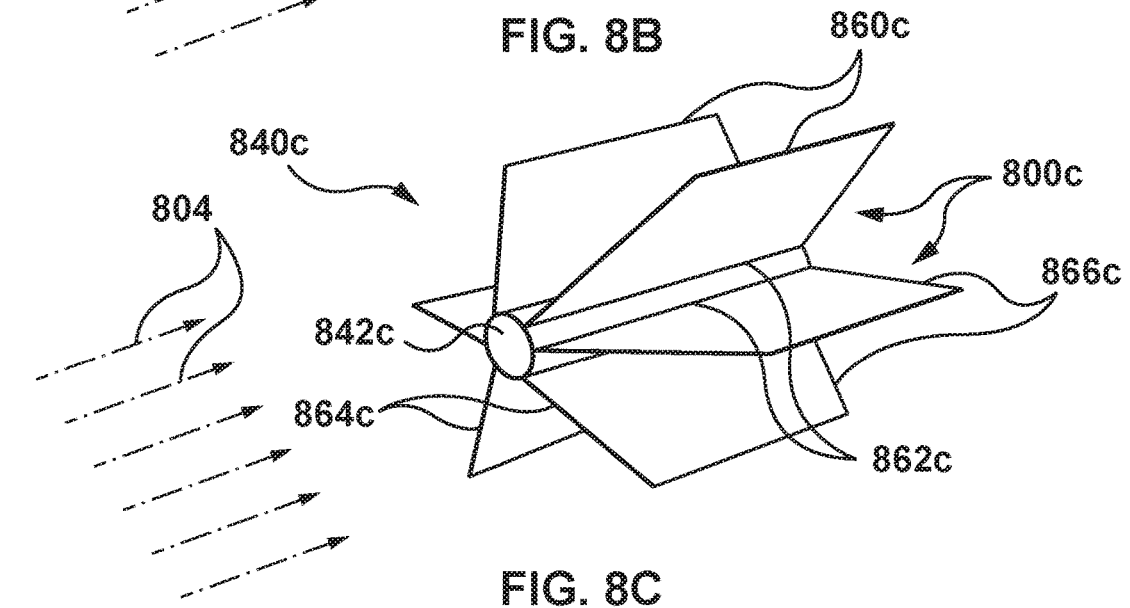
Figure 8D:
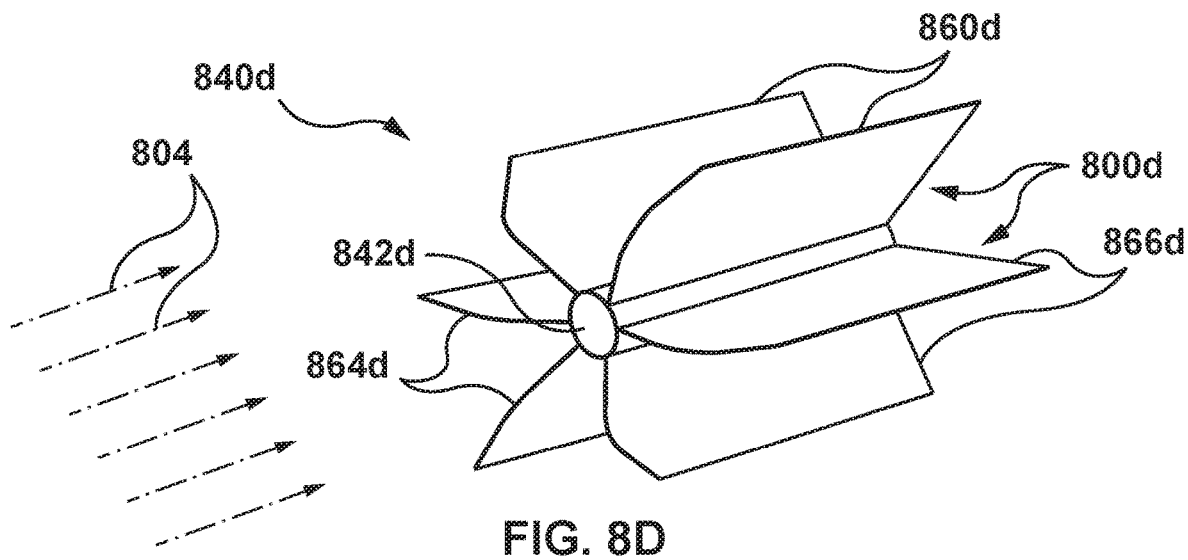
Figure 8E:
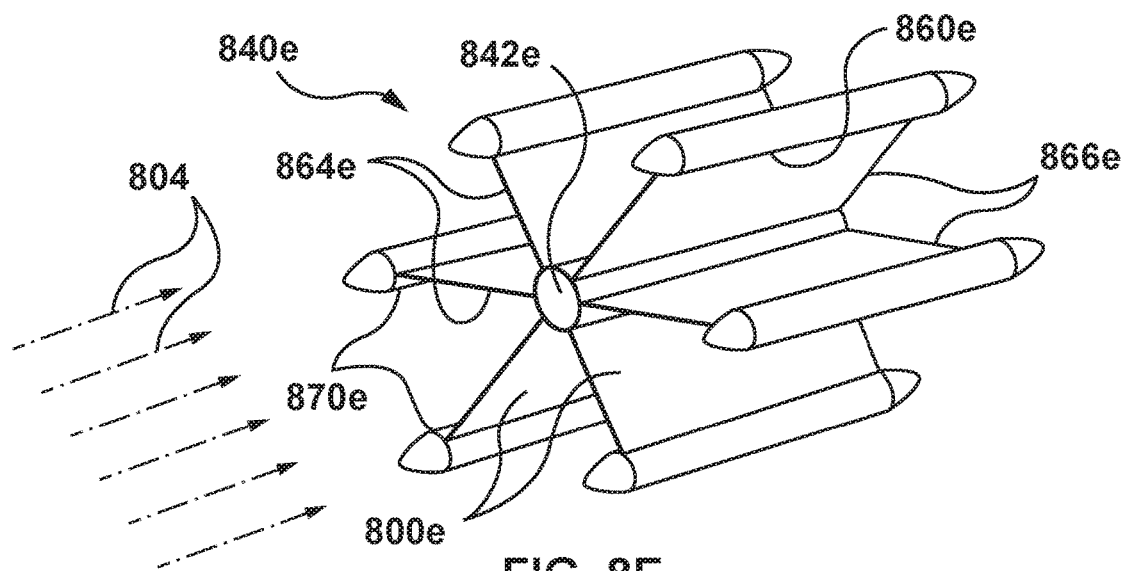
Figure 10:
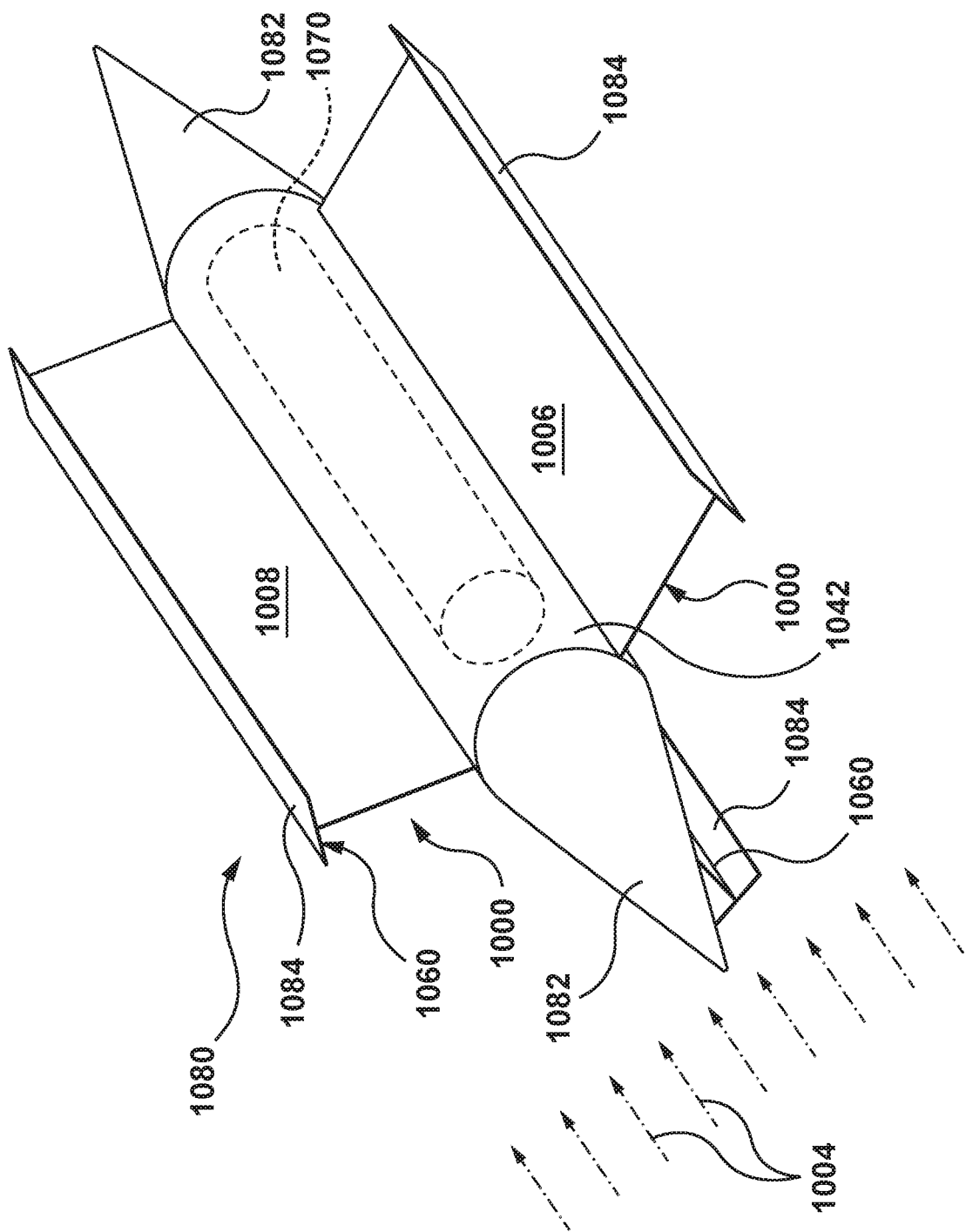
FIG. 10 shows an autonomous submerged hydrostatic pressure turbine in which the power extraction mechanism is disposed within the shaft of the hydrostatic pressure turbine runner according to an aspect of the present disclosure.

Performance of a hydrostatic pressure blade can be enhanced even further by adding ailerons at its edges, as shown in FIGS. 8E and 10, thereby reducing pressure leaks between the two surfaces of the hydrostatic pressure blade, or by forming the edges to have specific shapes, as shown in FIGS. 8A to 8D and 8F. Flaps as shown on FIGS. 2B and 2C may also be used. Thus, hydrostatic pressure blades may be provided with any one of formed ailerons, shaped edges and mechanical flaps, or a combination of any of these. The term "aileron", as used herein, refers to a hydraulic element at the edge of a hydrostatic pressure blade adapted to modify (e.g. enhance) its operational hydrodynamic characteristics. The term "flap", as used herein, refers to a movable extension at the leading edge or trailing edge of a hydraulic pressure blade adapted to modify (e.g. enhance) its operational hydrodynamic characteristics.

Figure 3A:
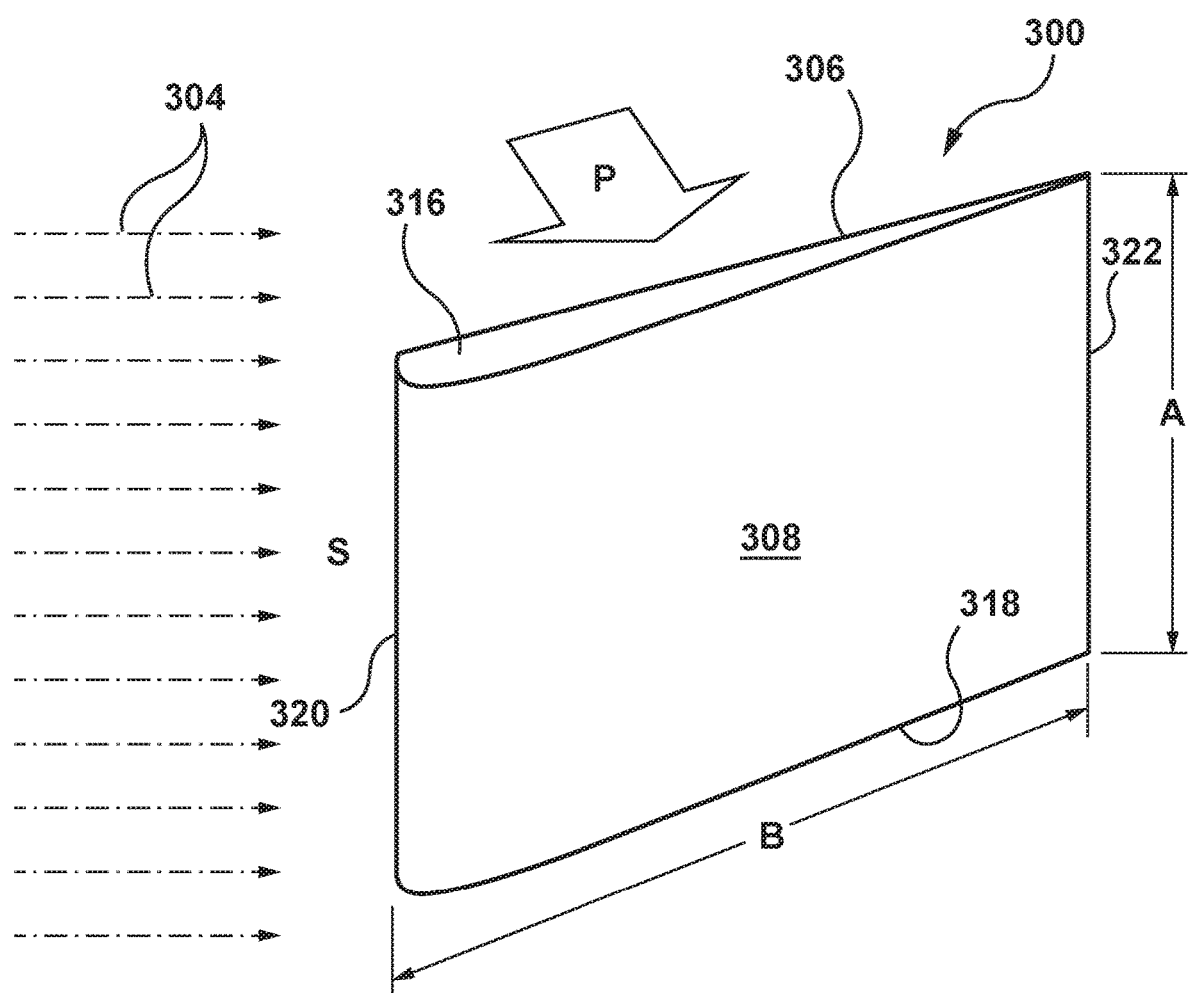
FIGS. 3A and 3B are schematic illustrations showing a perspective view and a profile view, respectively, of an illustrative hydrostatic pressure blade and summarizing the parameters affecting the amount of hydropower generated by a given hydrostatic pressure blade according to the present disclosure.
Figure 3B:
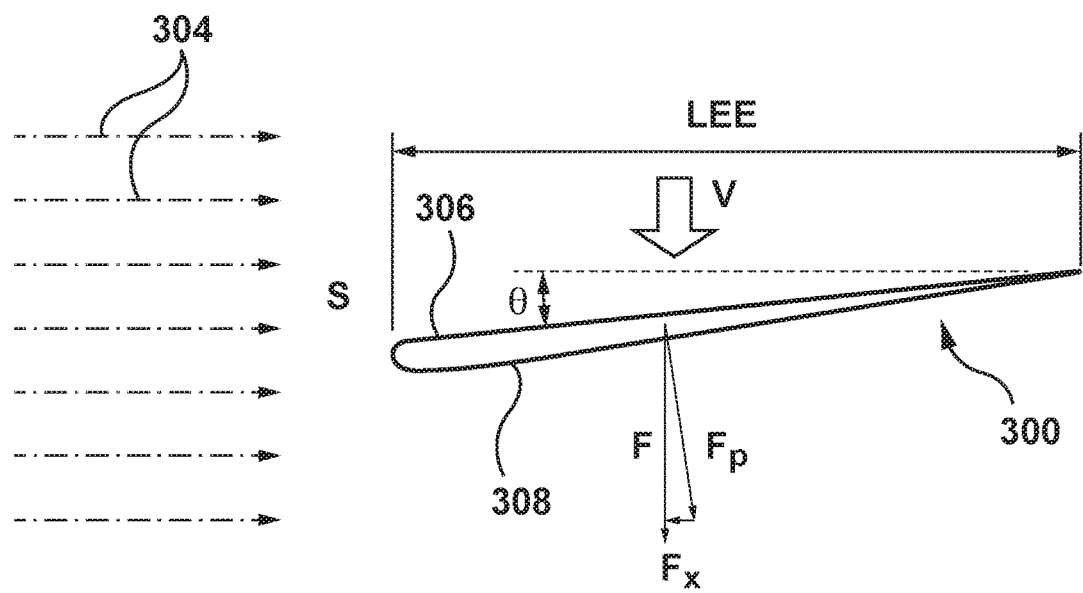

Reference is now made to FIGS. 3A and 3B, which provide schematic illustrations summarizing the various parameters affecting the amount of hydropower generated from hydrostatic pressure by a given hydrostatic pressure blade when immersed in a liquid flow (e.g. a flat-flowing river) while supported by a mechanical arrangement (e.g. a rotatable shaft) that allows the hydrostatic pressure blade to move only substantially perpendicularly to the flow direction.

FIGS. 3A and 3B show a hydrostatic pressure blade 300 whose upstream face 306 is substantially planar and whose downstream face 308 has an asymmetric convex shape. FIG. 3A shows a perspective view and FIG. 3B shows a profile view. The hydrostatic pressure blade 300 would typically extend from a rotatable shaft as part of a hydrostatic pressure turbine runner; in FIGS. 3A and 3B only the hydrostatic pressure blade 300 is shown for simplicity of illustration. In FIGS. 3A and 3B, reference S represents the speed of the flow, which is denoted by arrows 304 indicating the direction of the flow 304.

As seen in FIG. 3A, reference A denotes the span of the hydrostatic pressure blade 300. The span A of the hydrostatic pressure blade 300 is the dimension measured between the innermost edge 316 of the hydrostatic pressure blade relative to the shaft (not shown in FIGS. 3A and B, and the outermost edge 318 of the hydrostatic pressure blade 300 relative to the shaft, measured perpendicular to the flow direction 304 for the hydrostatic pressure turbine runner (not shown in FIGS. 3A and 3B).

Continuing to refer to FIG. 3A, reference B denotes the cord of the hydrostatic pressure blade 300. The cord length is defined as a distance between the foremost leading edge 320 of the hydrostatic pressure blade 300 and the rearmost trailing edge 322 of the hydrostatic pressure blade 300, measured substantially parallel to the flow direction 304 for the hydrostatic pressure turbine runner.

Still referring to FIG. 3A, the arrow P represents the hydrostatic force resulting from the aggregate pressure gradient of the flow 304 on the hydrostatic pressure blade 300. The aggregate pressure gradient is the balance of the flow pressures on the upstream surface 306 and the downstream surface 308 of the hydrostatic pressure blade 300.

Referring now to FIG. 3B, the hydrostatic pressure blade 300 has a non-zero angle of attack θ measured between the upstream face 306 of the hydrostatic pressure blade 300 and the flow direction 304 for the hydrostatic pressure turbine runner (not shown in FIG. 3B). As noted above, hydrostatic pressure turbine runners according to the present disclosure are distinguished from conventional flow-driven turbine runners in that they extensively exploit the potential energy of the water or other fluid. Proper selection of the angle of attack θ makes a critical contribution to having a substantial proportion of the total force $F_p$ driving movement of the hydrostatic pressure blade 300 across the flow 304 be contributed by the hydrostatic force P so that the potential energy can be exploited. To achieve this, the angle of attack θ is preferably less than or equal to thirty-five degrees (0<θ≤35°), more preferably less than or equal to thirty degrees (0<θ≤30°), still more preferably less than or equal to twenty-five degrees (0<θ≤25°) and yet still more preferably less than or equal to twenty degrees (0<θ≤20°). Current run-of-river turbine runner designs typically apply a relatively large angle of attack to maximize extraction of the kinetic energy of the water flow. In a hydrostatic pressure turbine runner according to aspects of the present disclosure, the angle of attack θ is considerably smaller than in a conventional flow-driven turbine runner. This relatively small angle of attack θ will reduce the ability of such a turbine runner to extract the kinetic energy of the flow 304, but at the same time, it allows such a turbine runner to extract more of the potential energy along the flow 304 via the hydrostatic force P resulting from the pressure gradient. The relatively small angle of attack θ allows for each hydrostatic pressure blade 300 to have a significantly longer cord B than in a conventional flow-driven turbine runner with a larger angle of attack. Typically, while the span A of each hydrostatic pressure blade 300 is limited by the depth of the river, there are fewer limitations to the extent of the length of the cord A of each hydrostatic pressure blade 300—the extent of the cord A will be limited only by the length of the river and the curvature of the river path. This in turn enables each hydrostatic pressure blade 300 to have a relatively large surface area.

The relatively small angle of attack θ also enables a relatively longer longitudinal engagement extent (LEE), which allows better exploitation of the hydrostatic pressure P along the flow 304. The longitudinal engagement extent is defined as the product of the cord length B multiplied by the sine of the angle of attack θ:

$$LEE = B * \sin θ \quad (1)$$

The longitudinal engagement extent may be conceptualized as the length of the flow 304, measured in the flow direct, that is engaged by the hydrostatic pressure blade 300 at a given moment.

Conventional run-of-river turbine runners have a short longitudinal engagement extent. Because the turbine blades are positioned at higher angle of attack—for better extracting the kinetic energy of the flow—their longitudinal engagement extent, which is the product of the blade's cord and the sine of its angle of attack, is typically relatively short (the sine of an angle decreases when the angle increases). Shorter longitudinal engagement extent reduces the overall drag of the blade and allows the turbine runner to extract more kinetic energy. At the same time, shorter longitudinal engagement extent limits the amount of potential energy available at any instant for extraction by the blade.

Extracting substantial amounts of the available potential energy is achieved by using a small angle of attack θ combined with a large surface area of the hydrostatic pressure blade. As the span of the blade in run-of-river applications is typically limited by the depth of the river, increasing the surface-area of a hydrostatic pressure blade can be achieved by increasing its cord length B. The combination of small angle of attack θ and long cord length B implies by definition a longer longitudinal engagement extent—which is a significant characteristic of the present hydrostatic pressure turbine runner blade design. The potential energy available at any instance for extraction—for a blade with given span—is proportional to its longitudinal engagement extent. For a hydrostatic pressure blade according to the present disclosure, the value of the longitudinal engagement extent divided by the span (LEE/A) is preferably greater than 0.75, more preferably, greater than 0.85 and still more preferably greater than 1.

Continuing to refer to FIG. 3B, the key forces acting on the hydrostatic pressure blade 300 will now be described.

The force denoted by $F_p$ is the total force acting on the surface of the hydrostatic pressure blade 300, perpendicularly to its cord B. The total force $F_p$ is the vector sum of the hydrostatic force P and the component of the hydrokinetic force that is perpendicular to the upstream surface 306 of the hydrostatic pressure blade 300.

The force denoted by $F_x$ is applied by the support (e.g. a rotatable turbine runner shaft, not shown in FIG. 3B, positioned with its axis of rotation substantially parallel to the flow direction 304 to thereby prevent the hydrostatic pressure blade 300 from moving downstream) that limits the hydrostatic pressure blade 300 to movement substantially perpendicular to the flow direction 304. The vector sum of those forces $F_p$ and $F_x$ is the final vector force, denoted by F, substantially perpendicular to the flow direction 304. The result is that the hydrostatic pressure blade 300 is pushed across the flow with a given velocity, denoted by arrow V, substantially perpendicular to the flow direction 304. The available power is the product of the force F and the velocity V.

Hence, the hydrostatic pressure turbine runners according to the present disclosure exploit hydrostatic pressure blades with long cords B, arranged at a small angle of attack θ, thereby obtaining a considerably longer longitudinal engagement extent (LEE) than conventional run-of-river turbine runner designs. Where the geography of the river permits, the cords B of the hydrostatic pressure blades can extend 100 meters or more, comparable to the span of many conventional windmill blades in air power generation applications.

Figure 4:
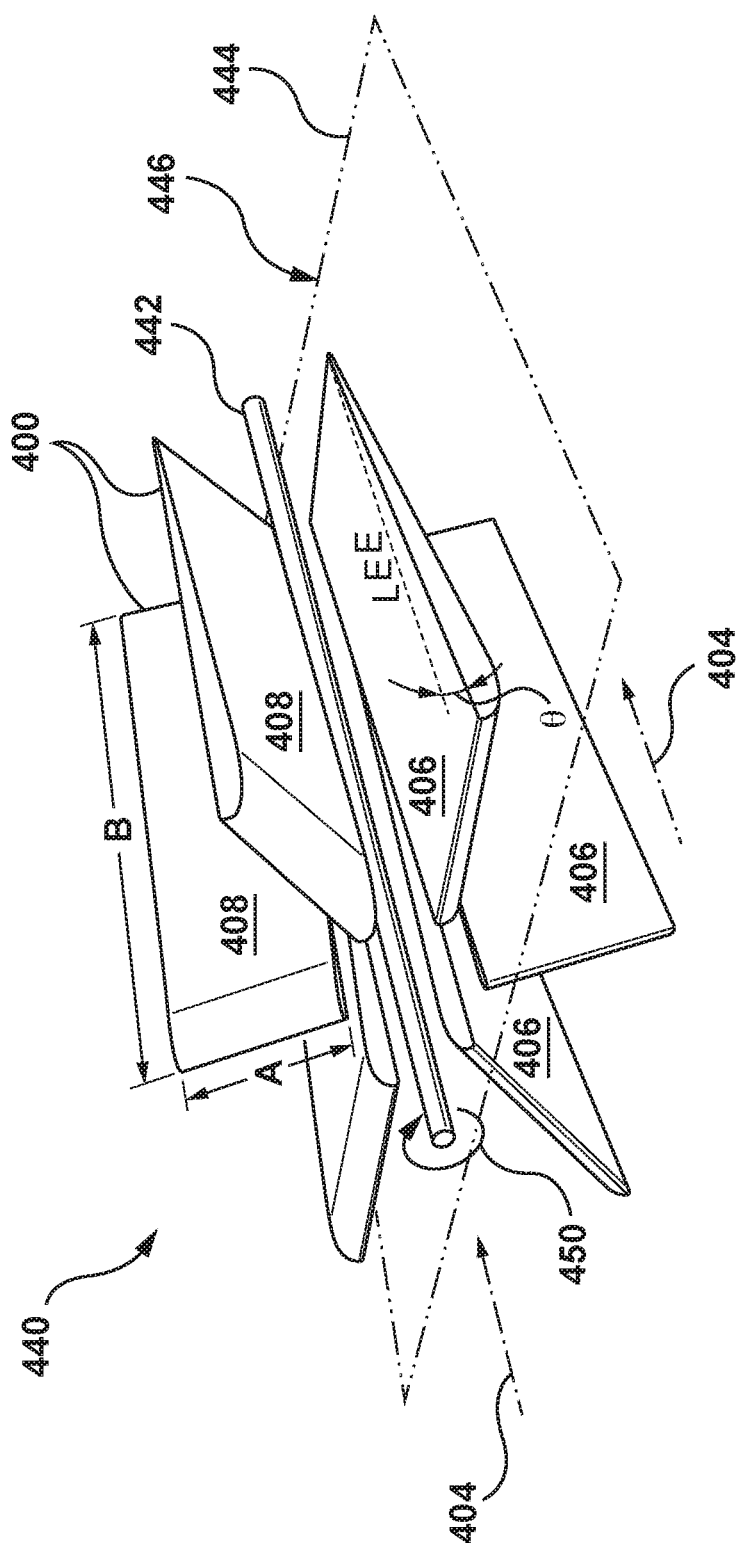
FIG. 4 shows an illustrative semi-submerged hydrostatic pressure turbine runner according to an aspect of the present disclosure.

Reference is now made to FIG. 4, which shows a first illustrative hydrostatic pressure turbine runner 440 according to an aspect of the present disclosure, for use in a flat-flowing river. The hydrostatic pressure turbine runner 400 comprises a rotatable shaft 442 and a plurality of hydrostatic pressure blades 400 carried by and extending radially outwardly from the shaft 442. Each of the hydrostatic pressure blades 400 as shown has, relative to the flow direction 404, an upstream face 406 that is substantially planar and a downstream face 408 having an asymmetric convex shape but may have any suitable shape. The hydrostatic pressure blades 400 may be mounted directly or indirectly to the shaft 442, which may be hollow or solid, and which may be circular in cross-section, or have any other suitable cross-sectional shape. The shaft 442 may form part of, or be mechanically coupled to, a power extraction mechanism (e.g. a generator). Thus, each hydrostatic pressure blade 400 is mechanically coupled to a power extraction mechanism. Preferably, the hydrostatic pressure blades 400 are circumferentially equally spaced about the shaft 442.

The hydrostatic pressure turbine runner 440 shown in FIG. 4 is a semi-submerged embodiment in which only a lower portion of the hydrostatic pressure turbine runner 440 is immersed below surface 444 of the river 446, with the shaft 442 above the surface 444. The hydrostatic pressure turbine runner 440 is immersed to a depth substantially equal to the span A of the hydrostatic pressure blades 400 and supported by mechanical couplings (not shown for simplicity of illustration) extending between the shaft 442 and the hydrostatic pressure blades 400. Thus, the hydrostatic pressure blades 400 are outwardly radially spaced from the shaft 442. The mechanical couplings preferably remain above the surface 444 of the river 446.

The shaft 442 is positioned with its axis substantially parallel to the flow direction 404. Because the hydrostatic pressure blades 400 are carried by the shaft 442, the hydrostatic pressure blades 400 are limited to movement across, i.e. substantially perpendicular to, the flow direction 402, with movement in other directions (e.g. downstream) being inhibited. At the same time, because the shaft 442 is rotatable, movement of the hydrostatic pressure blades 400 across the flow direction 402 delivers torque 450 to the shaft 442 and results in rotation of the shaft 442 about its axis. The magnitude of the torque 450 is determined by the product of the force F (see FIG. 3B) and the perpendicular distance of the torque vector from the axis of the shaft 442. In the illustrated embodiment the torque 450 is clockwise as shown.

Figure 5:
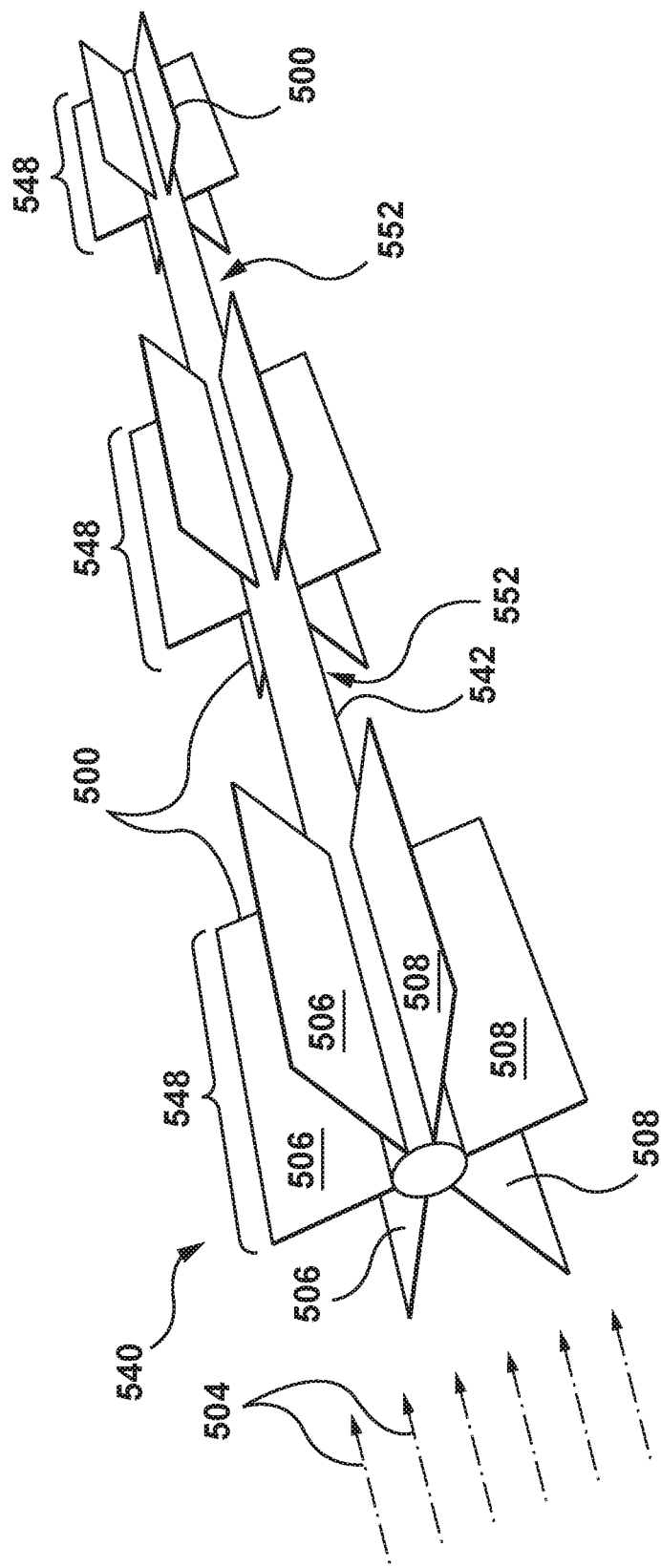
FIG. 5 shows an illustrative segmented hydrostatic pressure turbine runner according to an aspect of the present disclosure.

Reference is now made to FIG. 5, which shows a segmented hydrostatic pressure turbine runner 540 according to an aspect of the present disclosure. The hydrostatic pressure turbine runner 540 shown in FIG. 5 is similar to the one shown in FIG. 4 in that it comprises a rotatable shaft 542 and a plurality of circumferentially equally spaced hydrostatic pressure blades 500 carried by and extending radially outwardly from the shaft 542. The hydrostatic pressure blades 500 each have an upstream face 506 and a downstream face 508 relative to the flow direction 504. The upstream face 506 and the downstream face 508 are both shown as planar for ease of illustration but may have any suitable shape. As before, the shaft 542 may be part of, or be mechanically coupled to, a power extraction mechanism (e.g. a generator). In the segmented hydrostatic pressure turbine runner 540, the hydrostatic pressure blades 500 are arranged in a series of longitudinally spaced segments or modules 548, that is, sets of hydrostatic pressure blades 500 are arranged in longitudinal series on the shaft 542, separated by gaps 552. The shaft 542 may be of monolithic construction, or may itself be formed in coupled segments. A segmented hydrostatic pressure turbine runner 540 of the type shown in FIG. 5 can provide a greater cumulative longitudinal engagement extent while accommodating, for example, geographical features in the river or structural supports for the shaft 542. For a segmented hydrostatic pressure turbine runner 540 of the type shown in FIG. 5, the total longitudinal engagement extent for the segmented hydrostatic pressure turbine runner 540 is the arithmetical sum of all the longitudinal engagement extents of the individual segments 548; the extent of the gaps 552 is not included in the longitudinal engagement extent. The hydrostatic pressure turbine runner 540 may be semi-submerged or fully submerged.

The various segments 548 may be arranged so that the hydrostatic pressure blades 500 of each adjacent segment 548 are offset in their relative radial positions with respect to each other. The segments 548 may also differ in the angles of attack for their respective hydrostatic pressure blades 500. The performance of the hydrostatic pressure blades 500 of each of the individual segments 548 need not be identical, and the hydrostatic pressure blades 500 of each of the individual segments 548 can be enhanced by applying the various performance enhancements as delineated herein.

Figure 6A:
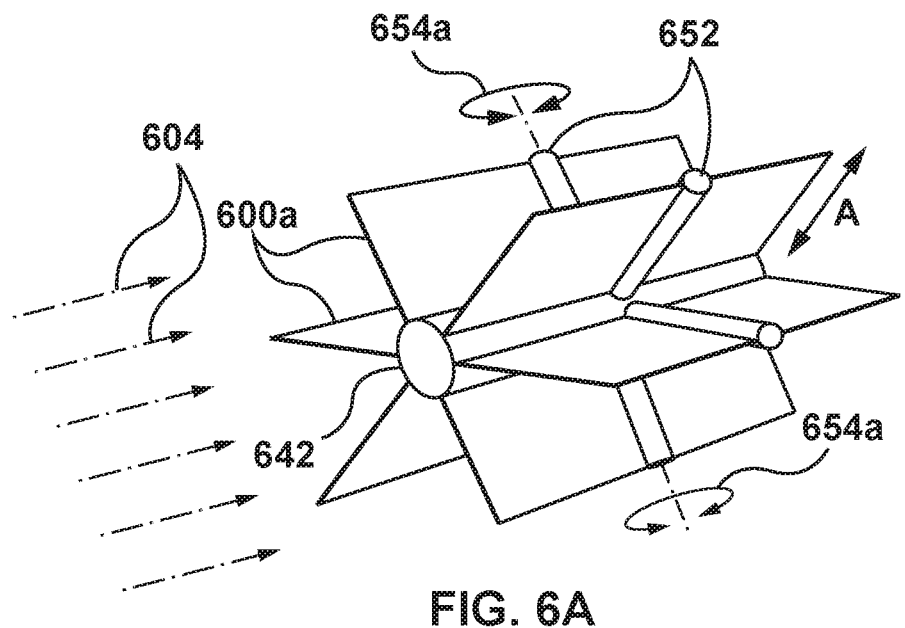
FIGS. 6A through 6C, show certain illustrative approaches for varying the angle of attack of hydrostatic pressure blades according to aspects of the present disclosure.
Figure 6B:
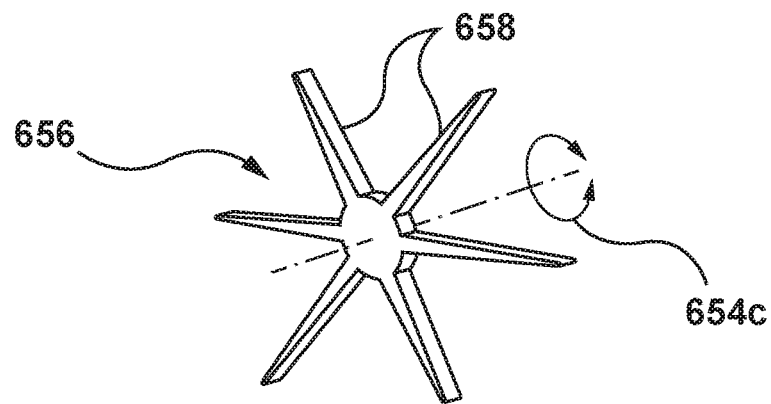
Figure 6C:
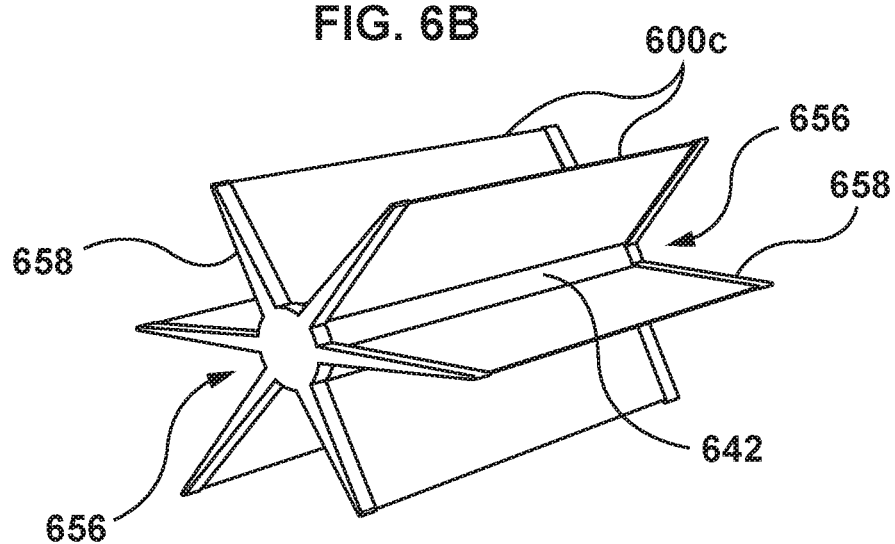

Moreover, in a hydrostatic pressure turbine runner according to the present disclosure the angle of attack need not be static, but can instead be varied. Reference is now made to FIG. 6A through 6C, which show certain illustrative approaches for varying the angle of attack of a hydrostatic pressure blade. Varying the angle of attack may be advantageous to accommodate variations in the flow conditions, for example seasonal variations.

Referring first to FIG. 6A, in an illustrative hydrostatic pressure turbine runner 640 each of the hydrostatic pressure blades 600a is mounted to the shaft 642 by way of a rotatable pivot arm 652. The pivot arms 652 extend substantially perpendicularly from the axis of the shaft 642 and substantially parallel to the span A of the shaft 542. By rotating the pivot arms 652 about their axes, as shown by arrows 654a, the angle of attack of the hydrostatic pressure blades 600 relative to the flow direction 604 can be adjusted.

Reference is now made to FIGS. 6B and 6C, which illustrate an arrangement in which the angle of attack can be varied by twisting the hydrostatic pressure blades 600. In this arrangement, the hydrostatic pressure blades 600c are made of flexible material and are attached to the shaft 642 by way of a pair of rigid stellate mounting frames 656 carried by the shaft 642. The stellate mounting frames 656 each comprise a plurality of outwardly extending spines 658, and the hydrostatic pressure blades 600c each extend between an opposed pair of the spines 658. At least one of the stellate mounting frames 656 is rotatable about the axis of the shaft 642, as shown by arrow 654c. By rotating one of the stellate mounting frames 656 relative to the other, the flexible material forming the hydrostatic pressure blades 600 can be twisted to thereby alter the angle of attack.

Thus, the angle of attack of the hydrostatic pressure blades may be either fixed or variable. The hydrostatic pressure blades of the runner may be, for example, planar on both sides, twisted (helical), curved on one side and planar on the other side, or curved on both sides, which curves may be identical or different. Other configurations are also possible.

Figure 7:
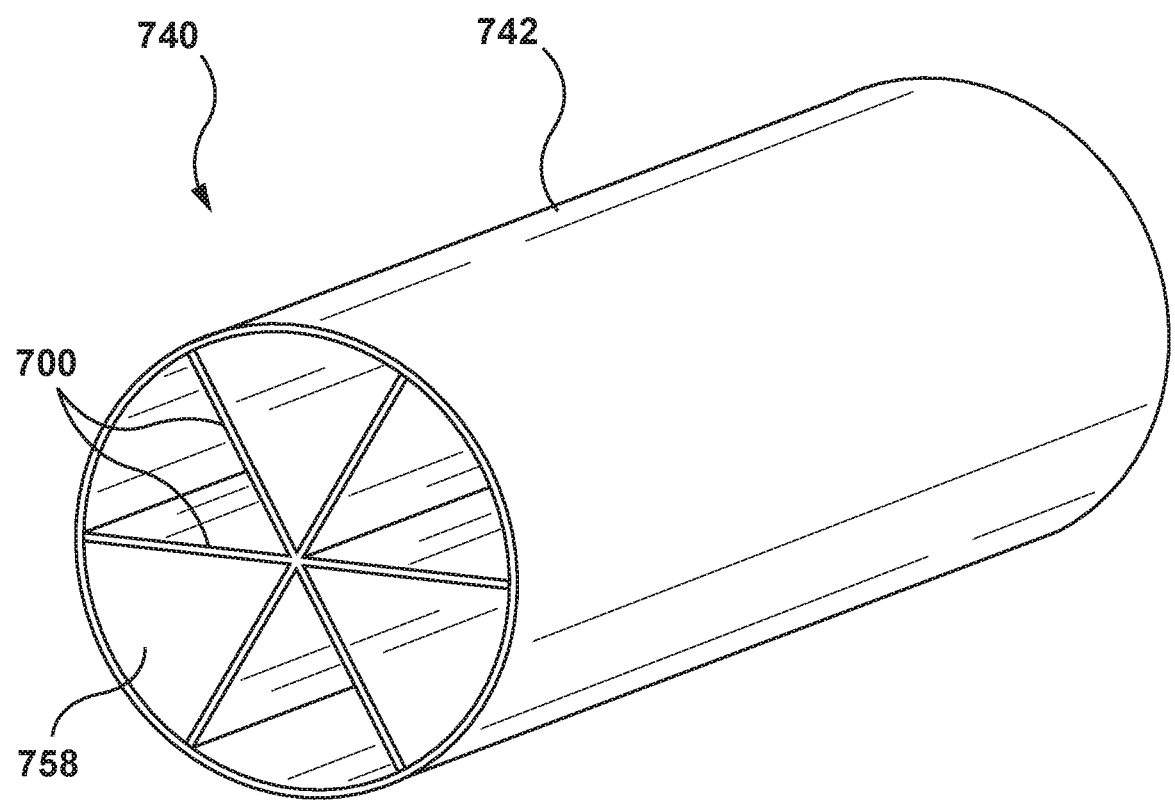
FIG. 7 shows an illustrative enclosed hydrostatic pressure turbine runner according to an aspect of the present disclosure.

FIG. 7 shows a submerged hydrostatic pressure turbine runner 740 according to an aspect of the present disclosure. In this embodiment the rotatable shaft 742 of the hydrostatic pressure turbine runner 740 takes the form of a hollow tube, and a plurality of hydrostatic pressure blades 700 are carried by the shaft 742 and extend inwardly from an inner surface 758 of the tubular shaft 742. Thus, in this embodiment the shaft 742 entirely encircles the hydrostatic pressure blades 700, and rotates with the hydrostatic pressure blades 700, and liquid can flow through the interior of the shaft 742 past the hydrostatic pressure blades 700.

Figure 7A:
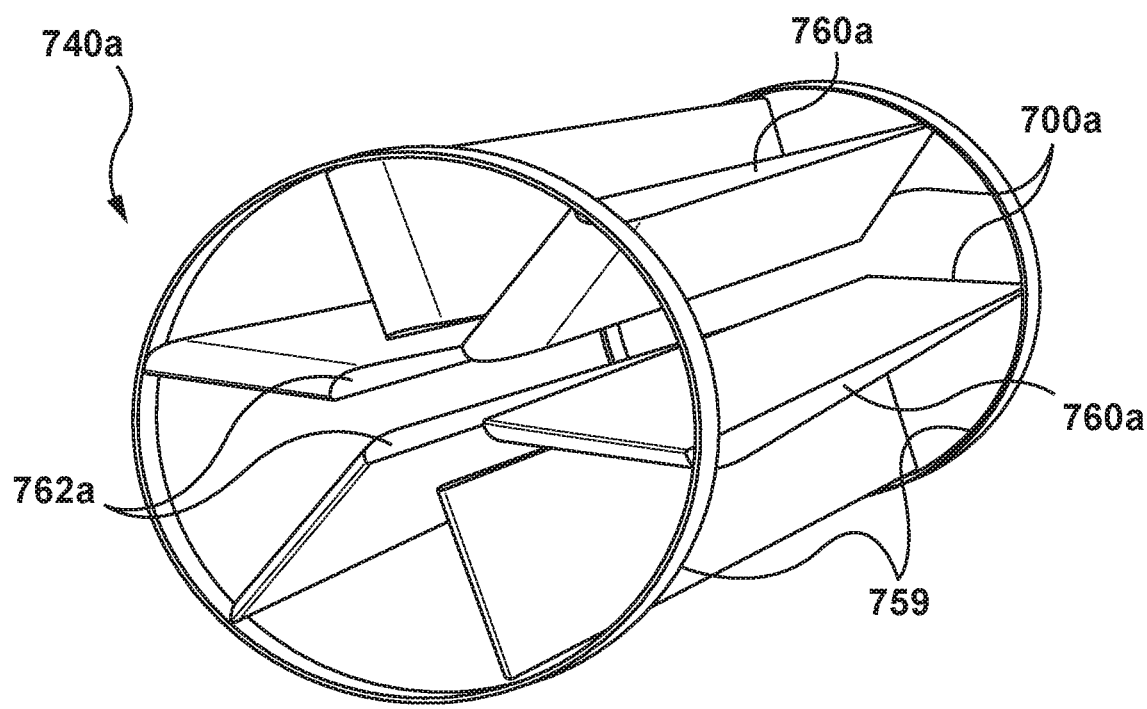
FIG. 7A shows an illustrative hydrostatic pressure turbine runner in which the hydrostatic pressure blades are fixed in relative position by a series of spaced-apart rings.

In an alternate embodiment, the shaft is an interrupted shaft rather than a continuous shaft, with structural integrity provided at least in part by the hydrostatic pressure blades. For example, instead of a continuous tubular shaft enclosing the hydrostatic pressure blades as shown in FIG. 7, FIG. 7A shows a submerged hydrostatic pressure turbine runner 740a in which the hydrostatic pressure blades 700a are fixed in relative position by a series of spaced-apart rings 759 that rotate with the hydrostatic pressure blades 700a. While FIG. 7A shows a pair of rings 759, in other embodiments there may be a larger number of rings. The hydrostatic pressure blades 700A shown in FIG. 7A are similar in shape to the hydrostatic pressure blades 400 shown in FIG. 4, but may have any suitable shape. The external edges 760a of the hydrostatic pressure blades 700a are coupled to the rings 759 and the internal edges 762a of the hydrostatic pressure blades 700a are radially spaced from one another.

In another embodiment, a hydrostatic pressure turbine runner in which the hydrostatic pressure blades extend outwardly from a central shaft may be enclosed by a fixed tube having a diameter slightly larger than the sum of the diameter of the shaft and the span of the hydrostatic pressure blades, creating an annular gap and allowing the hydrostatic pressure turbine runner to rotate inside the fixed tube. This permits a hydrostatic pressure turbine runner according to aspects of the present disclosure to be installed within a pipe or tunnel so as to harness liquid flow therein.

FIGS. 8A to 8F show various modifications to hydrostatic pressure blades according to aspects of the present disclosure, and represent potential optimizations to enhance performance under specific conditions. Although the modifications are shown individually for purposes of illustration, two or more modifications may be incorporated in a single hydrostatic pressure blade. Flow direction is shown by arrows 804.

FIG. 8A shows a hydrostatic pressure turbine runner 840a in which the external edges 860a (those furthest from the central shaft 842a) of the hydrostatic pressure blades 800a are longer than the internal edges 862a (those closest to the shaft 842a) thereof. This results in inclined leading edges 864a. FIG. 8B shows a similar hydrostatic pressure turbine runner 840b in which the external edges 860b of the hydrostatic pressure blades 800b are longer than the internal edges 862b thereof, but with the leading edges 864b curving concavely outwardly from the central shaft 842b. FIG. 8C shows a hydrostatic pressure turbine runner 840c in which the external edges 860c of the hydrostatic pressure blades 800c are shorter than the internal edges 862c, also resulting in inclined leading edges 864c, but in the opposite direction to that shown in FIG. 8A. FIG. 8D shows a hydrostatic pressure turbine runner 840d in which the leading edges 864d curve convexly outwardly from the central shaft 842d toward the external edges 860d of the hydrostatic pressure blades 800d. In each case, the trailing edges 866a, 866b, 866c, 866d remain perpendicular to the shaft 842a, 842b, 842c, 842d. Additionally or alternatively, the profile of the trailing edge may be altered in a manner similar to that shown for the leading edge, with the same or a different angle or curvature.

FIG. 8E shows a hydrostatic pressure turbine runner 840e in which tapered tubular ailerons 870 are affixed at the external edges 860e of the hydrostatic pressure blades 800e and extend beyond the leading edges 864e and the trailing edges 866e of the hydrostatic pressure blades 800e.

Figure 8F:
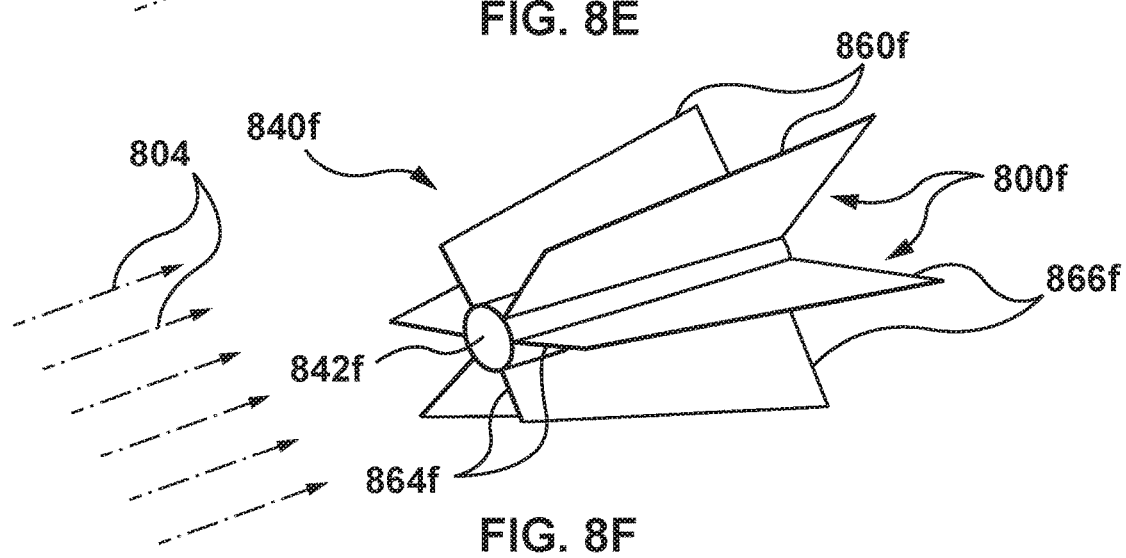

FIG. 8F shows a hydrostatic pressure turbine runner 840f in which the trailing edges 866f and the leading edges 864f of the hydrostatic pressure blades 800f are both substantially perpendicular to the shaft 842f, but with the trailing edges 866f being longer than the leading edges 864f. This results in the straight external edges 860f of the hydrostatic pressure blades 800f being angled rather than substantially parallel to the shaft 864f. This configuration is useful where the hydrostatic pressure turbine runner 840f is immersed into the flow with one end at a higher elevation than the other (see FIG. 9C, described below).

As noted above, in some embodiments the cords B of the hydrostatic pressure blades can extend 100 meters or more, and the span A may also be substantial. Because of the considerable size of a hydrostatic pressure turbine runner, and the fact that it is at least partially submerged under the surface of the water or other liquid, the power extraction mechanism (e.g. a generator) can be positioned above the surface. For example, where the hydrostatic pressure turbine runner is disposed in a river, the power extraction mechanism can be positioned on a floating barge (e.g. moored to the riverbanks), or attached to fixed supports at the riverbed bottom, or disposed on the riverbank. In case of fixed supports, a mechanical device may be used to adjust the elevation of the hydrostatic pressure turbine runner to accommodate seasonal changes in water levels.

The power generated by rotation of the hydrostatic pressure turbine runner has to be transmitted to the power extraction mechanism. The preferred position of the power extraction mechanism is at the downstream side of the hydrostatic pressure turbine runner, but upstream positions of the power extraction mechanism are also contemplated.

FIGS. 9A through 9C show some non-limiting examples of transfer arrangements for transmitting power from a hydrostatic pressure turbine runner to a power extraction mechanism such as an electrical generator.

FIG. 9A shows a hydrostatic pressure turbine runner 940a that is coupled to a power extraction mechanism 970a by way of a transfer gearbox 972; a similar arrangement may use a chain or belt transfer case instead of the gearbox 972. In the illustrated embodiment the gearbox 972 is substantially perpendicular to the shaft 942a of the hydrostatic pressure turbine runner 940a and the flow direction 904a although this is not strictly necessary.

FIG. 9B shows a hydrostatic pressure turbine runner 940b that is coupled to a power extraction mechanism 970b by way of direct transfer through an inclined linked driveshaft 974. In other embodiments, where the linked driveshaft uses two straight-angle transfer transmission gears, the power extraction mechanism unit can be positioned directly above the end of the hydrostatic pressure turbine runner.

FIG. 9C shows a hydrostatic pressure turbine runner 940c whose shaft 942c is inclined relative to the water surface 944. Despite this incline, the shaft 942c is kept parallel to the water flow direction 904 as measured in the horizontal plane (i.e. a vertical projection of the shaft 942c onto the water surface 944 is parallel to the flow direction 904). The shaft 942c extends well downstream of the hydrostatic pressure blades 900c, and can be coupled directly to the power extraction mechanism 970c located above the water surface 944. In the embodiment shown in FIG. 9C, the hydrostatic pressures blades 900 preferably have a trapezoid form with the trailing edges 966 being longer than the leading edges 964, so that the external edge 960c of the lowermost hydrostatic pressures blade 900c will be substantially parallel to the bottom of the riverbed.

Figure 9D:
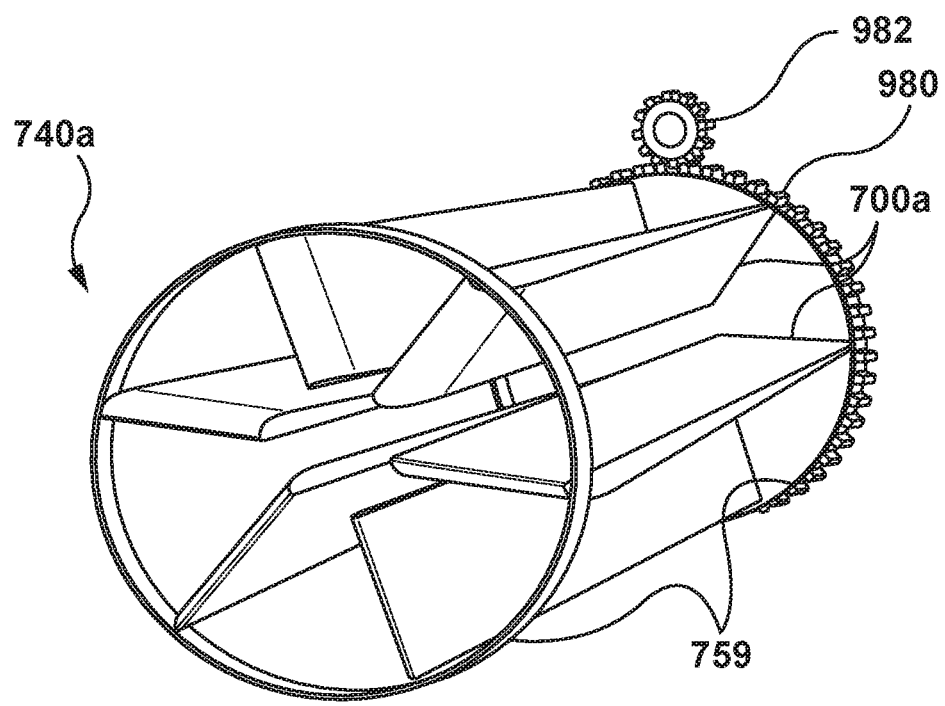
Figure 9E:
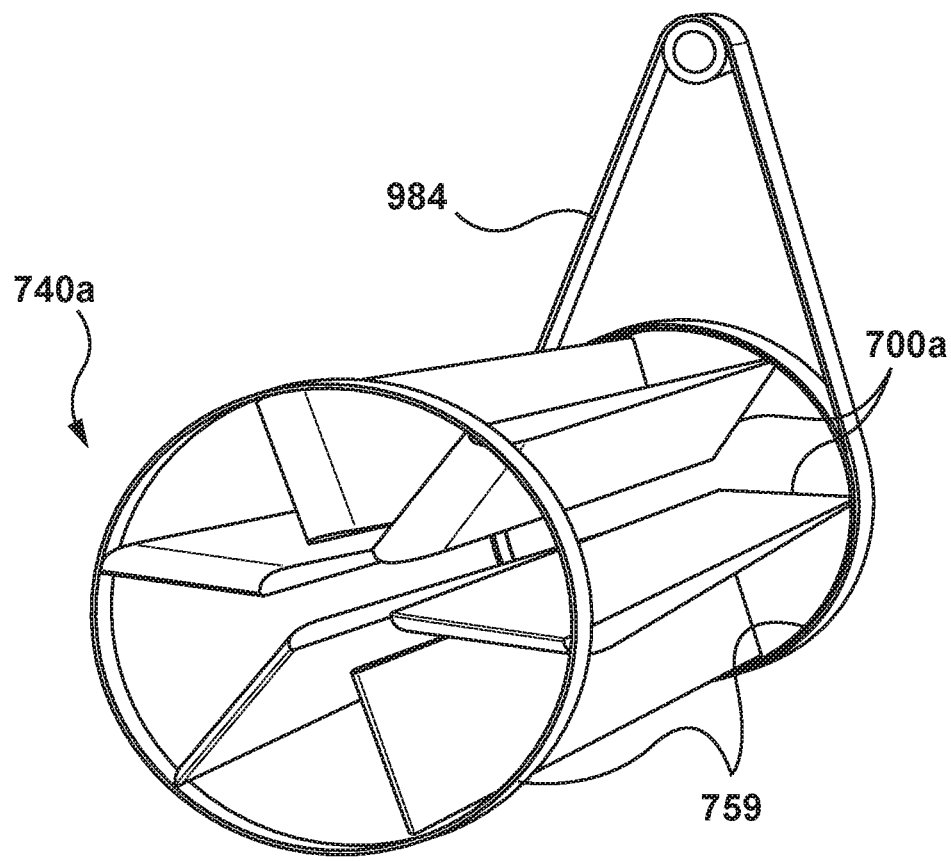

FIGS. 9D and 9E each show arrangements for transferring torque from a hydrostatic pressure turbine runner 740a of the type shown FIG. 7A, in which the hydrostatic pressure blades 700a are fixed in relative position by a series of spaced-apart rings 759 that rotate with the hydrostatic pressure blades 700a. In FIG. 9D, a downstream one of the rings 759 forms a gear surface 980 that meshes with another gear 982 to transfer torque to a power extraction mechanism. In FIG. 9E, a belt 984 is used to transfer torque; a chain could similarly be used.

Thus, a hydrostatic pressure turbine runner may be coupled to a power extraction mechanism apparatus through any suitable torque transmitting device, and accordingly, FIGS. 9A to 9E show various embodiments of turbines incorporating a hydrostatic pressure turbine runner according to aspects of the present disclosure. Hydraulic transfer of power from a hydrostatic pressure turbine runner to a power extraction mechanism is also contemplated. Accordingly, the term "hydrostatic pressure turbine" refers to a turbine that incorporates a hydrostatic pressure turbine runner adapted for extracting power out of the hydrostatic pressure of a flowing liquid so that a substantial proportion of the total force driving movement of each hydrostatic pressure blade across the flow is contributed by the hydrostatic force.

While the illustrative hydrostatic pressure turbine runners shown in the Figures described above each have six hydrostatic pressure blades, this is merely illustrative and a hydrostatic pressure turbine runner according to the present disclosure may have more or fewer hydrostatic pressure blades, depending on the installation. The number of blades will be influenced by design parameters such as the available space to accommodate the span of the hydrostatic pressure blades and the speed of the fluid flow.

FIG. 10 shows an autonomous submerged hydrostatic pressure turbine 1080 in which the power extraction mechanism 1070 is disposed within the shaft 1042 of the hydrostatic pressure turbine runner 1040. The flow direction is shown by arrows 1004. The shaft 1042 is enlarged to accommodate the power extraction mechanism 1070, with streamlined end caps 1082 (e.g. conical or similar). The end caps 1082 may be fixed to supports, for example on the riverbed, depending from a barge, etc. The shaft 1042 can rotate relative to the end caps 1082, and the power extraction mechanism 1070 comprises a stator disposed within the shaft 1042, which functions as a rotor. This arrangement can, with suitable engineering modifications, be reversed. Electrical cabling can then connect the power extraction mechanism 1070 to, for example, an electrical grid. In the embodiment shown, the three hydrostatic pressure blades 1000 of the hydrostatic pressure turbine runner 1040 include ailerons 1084 at their external edges 1060 to limit hydrostatic pressure leaks between the upstream side 1006 and the downstream side 1008 of the hydrostatic pressure blades 1000. The ailerons may have various shapes and forms, depending on the conditions. In another embodiment, the power extraction mechanism may be coupled directly to the end of the hydrostatic pressure turbine runner, rather than being incorporated into the shaft.

Thus, while the hydrostatic pressure turbine runner is wholly or partially submerged below the flow surface, the power extraction mechanism may be fixed above the flow surface or submerged below the flow surface.

Certain illustrative embodiments have been described by way of example. It will be apparent to persons skilled in the art that a number of variations and modifications can be made without departing from the scope of the invention as defined in the claims.

GLOSSARY

The following glossary is provided solely for convenience of reference:

"aileron" refers to a hydraulic element at the edge of a hydrostatic pressure blade adapted to modify (e.g. enhance) its operational hydrodynamic characteristics.

"angle of attack" ($\theta$) is measured between the upstream face of a hydrostatic pressure blade and the flow direction for the hydrostatic pressure turbine runner.

Betz' Law is a theoretical physical law, supported by experimental results, that sets the upper limit of extracting kinetic energy from a flow at 0.593 (59.3%) of the total kinetic energy going through the device extracting the energy.

"cord" and "cord length" is defined as a distance between the foremost leading edge of a hydrostatic pressure blade and the rearmost trailing edge of the hydrostatic pressure blade, measured substantially parallel to the flow direction for the hydrostatic pressure turbine runner.

"flap" refers to a movable extension at the leading edge or trailing edge of a hydraulic pressure blade adapted to modify (e.g. enhance) its operational hydrodynamic characteristics.

"head" is a measure of hydrostatic pressure in hydraulic systems, measured as the elevation of the upper surface of the liquid fed into the installation above the discharge surface level.

"hydrokinetic pressure" of a flow is the fluid pressure of the flow measured in the direction of the motion of the flow.

"hydrostatic pressure" of a flow is the fluid pressure measured in a direction that is perpendicular to the flow direction.

"hydrostatic pressure blade" refers to a blade for a turbine runner that is specifically adapted for extracting power out of the hydrostatic pressure of a flowing liquid such that a substantial proportion of the total force driving movement of each hydrostatic pressure blade across the flow is contributed by the hydrostatic force.

"hydrostatic pressure turbine" refers to a turbine that incorporates a hydrostatic pressure turbine runner adapted for extracting power out of the hydrostatic pressure of a flowing liquid so that a substantial proportion of the total force driving movement of each hydrostatic pressure blade across the flow is contributed by the hydrostatic force.

"hydrostatic pressure turbine runner" is a turbine runner that incorporates hydrostatic pressure blades positioned at an angle of attack adapted for extracting power out of the hydrostatic pressure of a flowing liquid so that a substantial proportion of the total force driving movement of each hydrostatic pressure blade across the flow is contributed by the hydrostatic force.

"longitudinal engagement extent" or "LEE" is defined as the product of the cord length multiplied by the sine of the angle of attack.

"run-of-river hydropower" refers to hydropower installations used for extracting hydropower with minimal interference with the water flow, typically used on flat-flowing rivers.

"span" of a hydrostatic pressure blade is the dimension measured between the innermost edge of the hydrostatic pressure blade relative to the shaft and the outermost edge of the hydrostatic pressure blade relative to the shaft, measured perpendicular to the flow direction for the hydrostatic pressure turbine runner.

What is claimed is:

1. A hydrostatic pressure turbine runner, comprising:
a rotatable shaft;
at least one hydrostatic pressure blade carried by the rotatable shaft;
the at least one hydrostatic pressure blade having an upstream face relative to a flow direction for the hydrostatic pressure turbine runner and a downstream face relative to the flow direction for the hydrostatic pressure turbine runner;

wherein the at least one hydrostatic pressure blade has an angle of attack θ measured between the upstream face and the flow direction for the hydrostatic pressure turbine runner wherein 0<θ≤35°;

the at least one hydrostatic pressure blade having a span between an innermost edge of the hydrostatic pressure blade relative to the shaft, and an outermost edge of the hydrostatic pressure blade relative to the shaft, measured perpendicular to the flow direction for the hydrostatic pressure turbine runner;

the at least one hydrostatic pressure blade having a cord length defined as a distance between a foremost leading edge of the hydrostatic pressure blade and a rearmost trailing edge of the hydrostatic pressure blade, measured parallel to the flow direction for the hydrostatic pressure turbine runner;

the at least one hydrostatic pressure blade having a longitudinal engagement extent (LEE) defined as the product of the cord length and the sine of the angle of attack θ;

wherein for the at least one hydrostatic pressure blade, a value of the LEE divided by the span is greater than 0.75; and wherein, when a liquid flows past the hydrostatic pressure turbine runner in the flow direction of the hydrostatic pressure turbine runner, a pressure gradient is created between the upstream face and the downstream face of the at least one hydrostatic pressure blade wherein an upstream pressure on the upstream face exceeds a downstream pressure on the downstream face;

whereby the pressure gradient applies a hydrostatic force to the upstream face of the at least one hydrostatic pressure blade, substantially perpendicular to the flow of the liquid;

wherein the hydrostatic force and the flow of the liquid each apply a respective force to the at least one hydrostatic pressure blade to drive movement of the at least one hydrostatic pressure blade across the flow of the liquid, substantially perpendicular to the flow of the liquid, to rotate the rotatable shaft;

wherein a total energy extracted from the liquid by the movement of each the at least one hydrostatic pressure blade across the flow of the liquid driven by the hydrostatic force and the flow of the liquid exceeds an amount equal to 66% of kinetic energy available solely from the flow of the liquid.

2. The hydrostatic pressure turbine runner of claim 1, wherein for each hydrostatic pressure blade, the value of the LEE divided by the span is greater than 0.85.

3. The hydrostatic pressure turbine runner of claim 1, wherein for each hydrostatic pressure blade, the value of the LEE divided by the span is greater than 1.

4. The hydrostatic pressure turbine runner of claim 1, wherein for each hydrostatic pressure blade, the value of the LEE divided by the span is greater than 1.5.

5. A hydrostatic pressure turbine incorporating the hydrostatic pressure turbine runner of claim 1.

* * * * *

UNITED STATES PATENT AND TRADEMARK OFFICE
CERTIFICATE OF CORRECTION

| | | |
|---|---|---|
| PATENT NO. | : 10,738,755 B1 | Page 1 of 1 |
| APPLICATION NO. | : 16/662632 | |
| DATED | : August 11, 2020 | |
| INVENTOR(S) | : On Hoter-Ishay | |

It is certified that error appears in the above-identified patent and that said Letters Patent is hereby corrected as shown below:

On the Title Page

Item [73], delete:
"On Hoter-Ishay (CA)"
And insert:
--ADCANIN INC. (CA)--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*